US012560950B2

(12) United States Patent
Felix et al.

(10) Patent No.: US 12,560,950 B2
(45) Date of Patent: Feb. 24, 2026

(54) FLOW CONTROL DEVICE

(71) Applicant: MedinCell S.A., Jacou (FR)

(72) Inventors: José Manuel Felix, Montarnaud (FR);
Jessica Marie Renée Madern,
Montpellier (FR); Frank Xavier Gaye,
Montpellier (FR); **Camille Madeleine
Dulac, Montpellier (FR); Romain
Tanguy Delamare**, Castelnau-le-Lez
(FR); Sarah Lemonnier,
Castelnau-le-Lez (FR); Marc Saliot,
Prades-le-lez (FR); Xavier Nouvelle,
Les Matelles (FR); **Domingos
Monteiros**, Saint Jean de Cuculles (FR)

(73) Assignee: MEDINCELL S.A., Jacou (FR)

( * ) Notice: Subject to any disclaimer, the term of this
patent is extended or adjusted under 35
U.S.C. 154(b) by 72 days.

(21) Appl. No.: 18/285,213

(22) PCT Filed: Mar. 30, 2022

(86) PCT No.: PCT/EP2022/058434
§ 371 (c)(1),
(2) Date: Sep. 29, 2023

(87) PCT Pub. No.: WO2022/207716
PCT Pub. Date: Oct. 6, 2022

(65) Prior Publication Data
US 2024/0176370 A1      May 30, 2024

(30) Foreign Application Priority Data
Apr. 1, 2021    (GB) ...................................... 2104739

(51) Int. Cl.
*G05D 7/06* (2006.01)
*G05D 9/12* (2006.01)

(52) U.S. Cl.
CPC ............. *G05D 7/0647* (2013.01); *G05D 9/12*
(2013.01); *Y10T 137/2577* (2015.04); *Y10T
137/27* (2015.04); *Y10T 137/7303* (2015.04)

(58) Field of Classification Search
CPC .......... G05D 7/0647; G05D 9/00; G05D 9/02;
G05D 9/04; G05D 9/12; Y10T 137/2577;
(Continued)

(56) References Cited

U.S. PATENT DOCUMENTS 3,520,638 A * 7/1970 Blackgrove ........... G01F 23/263
137/392
4,297,081 A * 10/1981 Irvin ........................ G05D 9/12
417/63
(Continued)

OTHER PUBLICATIONS

International Search Report for PCT/EP2022/058434 (PCT/ISA/
210) mailed on Aug. 29, 2022.
(Continued)

*Primary Examiner* — William M McCalister
(74) *Attorney, Agent, or Firm* — Birch, Stewart, Kolasch
& Birch, LLP

(57) ABSTRACT

A device for controlling flow of a fluid, comprising: a first
valve comprising: a selectively openable inlet; an opening;
a selectively openable outlet, arranged such that fluid may
enter the first valve through the inlet, exit the first valve
through the opening, enter the first valve through the open-
ing and exit the first valve through the outlet; a first sensor
for detecting a fluid; a second sensor for detecting a fluid, the
first sensor and second sensor in fluid communication with
the first valve via the opening; a controller for receiving
signals from the first sensor and second sensor and for
controlling opening and closing of the inlet and outlet in
response to receiving said signals, arranged to allow, in use,
a fluid to flow through the device by flowing: —into the first
valve through the inlet of the first valve; —out of the first
(Continued)

valve through the opening of the first valve; —past the first sensor for detecting a fluid; —to the second sensor for detecting a fluid; —into the first valve through the opening of the first valve; —out of the first valve through the outlet of the first valve.

20 Claims, 4 Drawing Sheets

(58) Field of Classification Search
CPC ............. Y10T 137/27; Y10T 137/7287; Y10T 137/7303
USPC ......................... 137/115.02, 87.02, 391, 386
See application file for complete search history.

(56) References Cited

U.S. PATENT DOCUMENTS

| | | | | |
|---|---|---|---|---|
| 4,690,699 | A * | 9/1987 | Sugisawa | A61L 9/16 96/225 |
| 4,711,117 | A * | 12/1987 | Cosser | G01F 23/00 73/1.73 |
| 4,958,665 | A * | 9/1990 | Iwano | G01F 23/72 53/503 |
| 5,029,602 | A * | 7/1991 | McKinney | G05D 9/12 280/47.2 |
| 5,378,089 | A * | 1/1995 | Law | B01J 4/00 406/137 |
| 5,383,574 | A * | 1/1995 | Raphael | G01F 11/284 222/64 |
| 5,653,533 | A * | 8/1997 | Green | B28C 7/0418 366/182.1 |
| 6,019,250 | A * | 2/2000 | Pozniak | B24B 57/02 222/1 |
| 6,098,843 | A * | 8/2000 | Soberanis | B67D 7/0238 222/53 |
| 6,711,934 | B2 * | 3/2004 | Barbe | D06F 33/37 73/1.59 |
| 6,931,926 | B1 * | 8/2005 | Van Ee | G01N 9/28 73/299 |
| 7,810,516 | B2 * | 10/2010 | Gerken | F04F 1/02 137/87.02 |
| 7,895,890 | B2 * | 3/2011 | Van Ee | G01F 23/165 73/61.41 |
| 8,020,584 | B2 * | 9/2011 | Love | F16F 9/16 188/371 |
| 8,882,714 | B1 * | 11/2014 | Perry | A61M 5/3295 604/164.02 |
| 10,884,437 | B1 | 1/2021 | Black et al. | |
| 2002/0112758 | A1 * | 8/2002 | Xu | B24B 57/02 137/209 |
| 2003/0034305 | A1 * | 2/2003 | Luehmann | A61M 1/1668 210/257.2 |
| 2004/0211731 | A1 * | 10/2004 | Ferguson | G05D 21/02 210/764 |
| 2006/0204404 | A1 | 9/2006 | Brown | |
| 2008/0184896 | A1 * | 8/2008 | Brouwer | F16K 23/00 99/300 |
| 2011/0017323 | A1 * | 1/2011 | Herbst | A01J 5/0135 137/551 |
| 2012/0097267 | A1 * | 4/2012 | Chu | C02F 1/008 137/391 |
| 2012/0255352 | A1 * | 10/2012 | Sakaguchi | G05D 9/12 73/290 R |
| 2015/0167415 | A1 * | 6/2015 | Leuchtenberg | E21B 21/067 137/155 |
| 2015/0261227 | A1 * | 9/2015 | Wiersma | G01F 23/74 137/386 |
| 2018/0209875 | A1 * | 7/2018 | Curtis | G05D 9/12 |
| 2018/0215352 | A1 * | 8/2018 | Barret | G05D 9/12 |
| 2019/0100444 | A1 * | 4/2019 | Black | C02F 1/686 |
| 2019/0267260 | A1 * | 8/2019 | Iwao | H01L 21/67051 |
| 2023/0173404 | A1 * | 6/2023 | Cain | G05D 9/12 137/2 |

OTHER PUBLICATIONS

Written Opinion of the International Searching Authority for PCT/EP2022/058434 (PCT/ISA/237) mailed on Aug. 29, 2022.

* cited by examiner

FLOW CONTROL DEVICE

FIELD

The present application is generally related to a device for controlling flow of a fluid, and is particularly related to a system for delivering predetermined volumes of a fluid, where the system is connected to a fluid reservoir.

BACKGROUND

Accurate delivery of fluid volumes is important in many areas. Syringe pumps and the like are popular laboratory equipment for accurate delivery of predetermined fluid volumes. Syringe pumps may be operated to gradually deliver small amounts of fluid. The pump operates to regulate the delivery of fluid and can be controlled to delivery specific rates and volumes. A typical syringe pump may hold around 60 mL of fluid and deliver at a pumping rate of around 1000 mL/hr.

Some known drawbacks associated with syringe pumps are: the response time, which can vary from seconds to hours depending on the fluidic resistance and compliance; the flow rate, which, without flow meters, cannot be known during the transient period; and, associated fine-tuning difficulties.

An object of at least certain embodiments is to address one or more of these problems.

SUMMARY

According to a first aspect of this invention, there is provided a device for controlling flow of a fluid, comprising: a first valve, the first valve comprising: a selectively openable inlet; an opening; and, a selectively openable outlet, arranged such that fluid may enter the first valve through the inlet, exit the first valve through the opening, enter the first valve through the opening and exit the first valve through the outlet; a first sensor for detecting a fluid; a second sensor for detecting a fluid, the first sensor and second sensor in fluid communication with the first valve via the opening; a controller for receiving signals from the first sensor and second sensor and for controlling opening and closing of the inlet and outlet in response to receiving said signals, arranged to allow, in use, a fluid to flow through the device by flowing: into the first valve through the inlet of the first valve; out of the first valve through the opening of the first valve; past a first sensor for detecting a fluid; to a second sensor for detecting a fluid; into the first valve through the opening of the first valve; out of the first valve through the outlet of the first valve.

The valve of the device enables control a flow rate of a fluid at a desired value. The arrangement of the device can result in a highly precise delivery of fluid from the device. Such precision can be attributed to the arrangement of features and specifically the interaction between the inlet, outlet, sensors and the controller. Effects of such a device include maintenance of the flow rate from the device even with changing fluidic conditions. Furthermore, the device is able to ensure the same flow rate for multiple outlets.

In an embodiment the controller is arranged to: close the inlet in response to receiving a signal from the second sensor, the signal being sent in response to the second sensor detecting a fluid; and, close the outlet in response to receiving a signal from the first sensor, the signal being sent in response to the first sensor detecting a fluid after the signal from the second sensor is sent.

The device may reliably perform delivery of specific fluid amounts over many iterations.

In an embodiment, the signal being sent in response to the second sensor detecting a fluid is a close inlet signal; and, the signal being sent in response to the first sensor detecting a fluid is a close outlet signal.

In an embodiment, detecting a fluid comprises at least one of: detecting a fluid being adjacent a sensor; detecting a fluid passing a sensor; detecting a change in fluid from a first fluid to a second fluid being adjacent a sensor; and, detecting a change in fluid from a first fluid to a second fluid passing a sensor.

The sensors of the device may reliably detect fluids. The reliability of detection assists the device deliver repeatable doses of fluids from the device.

In an embodiment, the device further comprises a second valve, the second valve arranged downstream of the outlet of the first valve.

The second valve of the device may assist in controllably delivering predetermined amounts of fluid. The second valve enables an amount to be held for a period of time prior to delivery. This can be advantageous in situations where immediate delivery is not desirable. The second valve also provides failure resilience for the device.

In an embodiment, the device comprises a fluid channel arranged to carry a fluid between the first valve, the first sensor and the second sensor, wherein the fluid channel is arranged to hold a volume of fluid between the first valve and second sensor of around 10 μl to around 1000 μl of fluid.

The device may provide fluid at specific flow rates, which are repeatable and durable for slight changes in fluidic conditions. The flow rates are typically of a durability that cannot be delivered accurately using current techniques. By durability it is meant that the flow rate is closely maintained even under changing fluid conditions and resistances. Such maintenance of flow rate is unavailable with current techniques.

In an embodiment, the device further comprises a fluid reservoir in fluid connection with the valve via the inlet, wherein the controller is arranged to control entry of fluid held, in use, in the fluid reservoir, to the valve via the inlet.

The device may enable fluid to be controllably delivered in predetermined doses from a store of fluid. The store may hold large volumes of fluid so that the device may operate over a relatively long period of time without requiring the device arrangement to be altered by a user. This in turn increases the ease of use of the device for a user.

In an embodiment, a device wherein the opening is a selectively openable opening.

The selectively openable opening of the device may enable greater user control over the operation of the device. Selective opening of the opening of the device enables an additional level of control over specific steps in the operation of the device for the user. The increase in complexity of device is offset by a greater level of control provided to the user.

In an embodiment, the fluid is a liquid.

According to a second aspect of this invention, there is provided a method of controlling flow of a fluid comprising: filling a fluid channel with a fluid to a first predetermined level; detecting the filling of the fluid channel to the first predetermined level; in response to the detecting, draining the fluid channel to a second predetermined level, wherein the second predetermined level is less than the first predetermined level; and, detecting the draining of the fluid channel to the second predetermined level.

The method may be enacted to control flow rate at a desired volume. The steps of the method result in a highly precise delivery of fluid from a fluid channel. Such precision can be attributed to the arrangement of steps and specifically the interaction between the filling, draining, and detecting. Effects of such a method include maintenance of the flow rate from the fluid channel even with changing fluidic conditions.

According to a third aspect of this invention, there is provided a method of controlling flow of a fluid, comprising: opening an inlet of a valve to allow a fluid to enter the valve; passing the fluid through an opening of the valve; detecting the fluid by a second sensor; in response to detecting the fluid by the second sensor, closing the inlet of the valve to prevent fluid entering the valve; after closing the inlet of the valve, opening an outlet of the valve to allow fluid to exit the valve; detecting a fluid by a first sensor; and, in response to detecting a fluid by the first sensor, closing the outlet of the valve to prevent fluid exiting the valve, wherein a greater volume of fluid is required to enter the valve for detection by the second sensor than for detection by the first sensor.

The method may be enacted to control flow rate at a desired volume. The steps of the method result in a highly precise delivery of fluid from a valve. Such precision can be attributed to the arrangement of steps and specifically the interaction between the inlet, outlet, opening and sensors. Effects of such a method include maintenance of the flow rate from the fluid channel even with changing fluidic conditions.

In an embodiment, the method further comprises in response to detecting the fluid by a second sensor, sending a message from the second sensor to a controller that fluid has been detected, and in response to receiving the message from the second sensor by the controller, sending a message to a valve to close the inlet of the valve to prevent fluid entering the valve.

Detection of the fluid by a second sensor and sending a message to a controller, which acts accordingly to the received message, increases the reliability of the delivery of predetermined amounts of fluid. The controller also increases the ease with which the device may operate, as it removes the need for a user to assist in specific phases of operation of the valve.

In an embodiment, the method further comprises in response to detecting the fluid by the first sensor, sending a message from the first sensor to a controller that fluid has been detected, and in response to receiving the message from the first sensor by the controller, sending a message to a valve to close the outlet of the valve to prevent fluid exiting the valve.

The method may be enacted to increase the reliability of the delivery of predetermined amounts of fluid. The controller also increases the ease with which the device may operate, as it removes the need for a user to assist in specific phases of operation of the valve.

In an embodiment, the method further comprises sending a message to a fluid delivery system of a fluid reservoir to initiate fluid delivery from the reservoir to the valve.

The method may be enacted to enable fluid to be controllably delivered in predetermined doses from a store of fluid. The store may hold large volumes of fluid so that the method may be used over a relatively long period of time without requiring the method to be altered by a user, for example by introducing fluid or a fluid source repeatedly. This in turn increases the ease of use of the method for a user.

In an embodiment, the method further comprises delivering a predetermined volume of fluid from the valve, wherein the predetermined volume is about 2 µl to around 100 µl of fluid.

The device may provide fluid at specific flow rates, which are repeatable and durable for slight changes in fluid resistances. The flow rates are typically of a durability that cannot be delivered accurately using current techniques. The flow rate is maintained even under changing fluid conditions and resistances unlike with current techniques.

In an embodiment, the fluid is a liquid.

In an embodiment, the method further comprises holding a fluid between the valve and the second sensor for a predetermined period of time prior to opening an outlet of the valve to allow fluid to exit the valve.

The method may be enacted to controllably deliver predetermined amounts of fluid. The method enables an amount of fluid to be held for a period of time prior to delivery. This can be advantageous in situations where immediate delivery is not desirable. The method also provides failure resilience as operational checks can be performed during the predetermined period of time to ensure standard, i.e. non erroneous, operation of the method occurs.

BRIEF DESCRIPTION OF THE DRAWINGS

Specific embodiments will be described below by way of example only and with reference to the accompanying drawings, in which.

SPECIFIC DESCRIPTION OF CERTAIN EXAMPLE EMBODIMENTS

Figure 1:
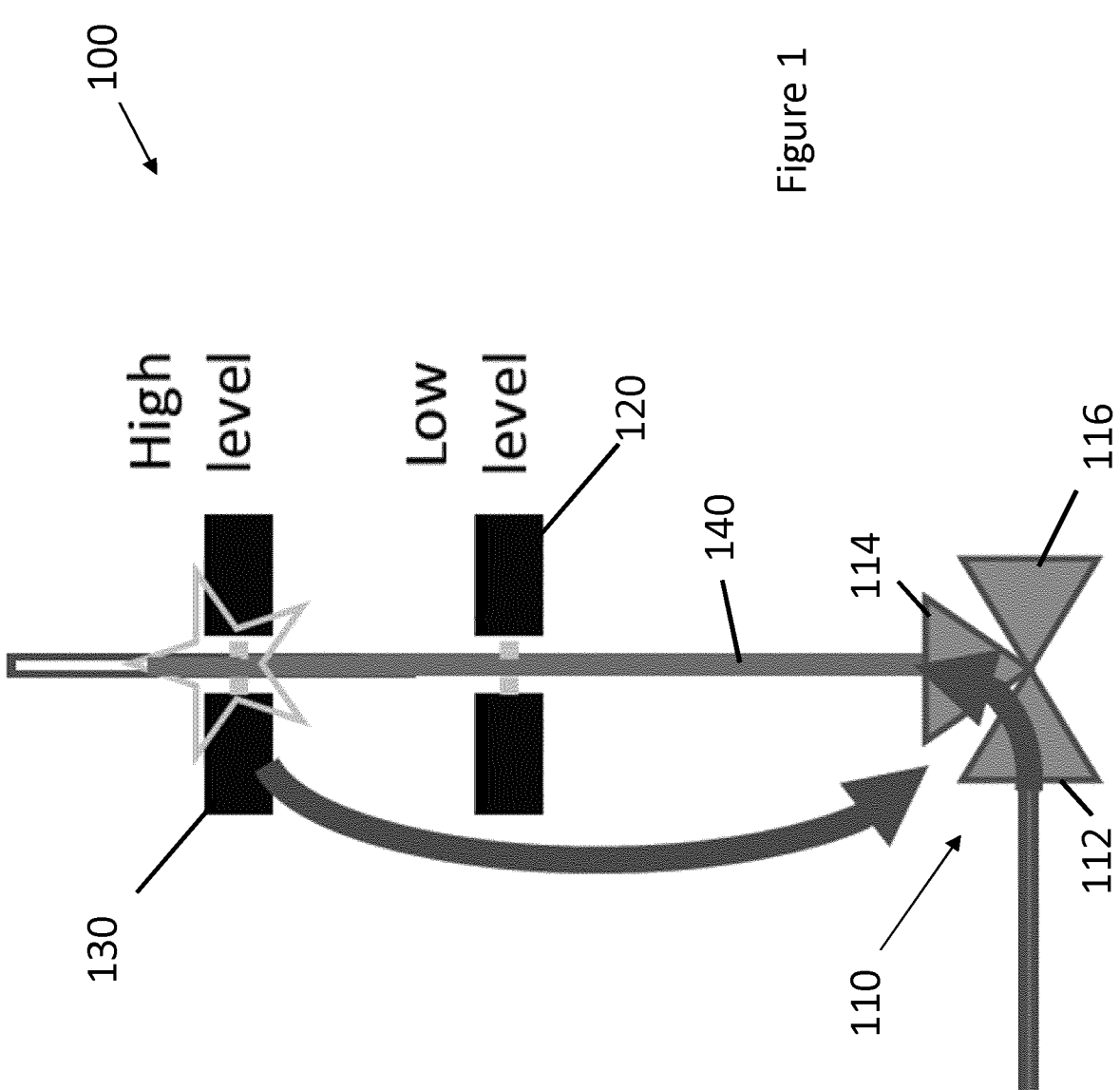
FIG. 1 shows a schematic sectional view of a device for controlling flow of a fluid in accordance with a first example.

FIG. 1 shows a schematic sectional view of a device 100 for controlling flow of a fluid. The device 100 has a valve 110, a first sensor 120 and a second sensor 130. The valve 110 has a selectively openable inlet 112. The valve 110 has an opening 114. The valve 110 has a selectively openable outlet 116. The valve 110 is arranged such that fluid may enter the valve 110 through the inlet 112, exit the valve 110 through the opening 114, enter the valve 110 through the opening 114 and exit the valve 110 through the outlet 116.

The device 100 also has a controller (not shown) for receiving signals from the first sensor 120 and the second sensor 130 and for controlling opening and closing of the inlet 112 and the outlet 116 in response to receiving the signals.

The device 100 operates to control flow of a fluid by allowing a fluid to flow into the valve 110 through the inlet 112 of the valve 110. Fluid may flow out of the valve 110 through the opening 114. Fluid exiting the valve 110 via the opening 114 may pass the first sensor 120. If further fluid exits the valve 110 via the opening 114, the fluid may then flow to the second sensor 130. The fluid re-enters the valve 110 via the opening 114 and may exit the valve 110 through the outlet 116.

Prior to use the device 100 is closed, in that the inlet 112 is closed and no fluid can enter the valve 110. The outlet 116 may also be closed prior to the device 100 being used. When operated, the controller of the device 100 sends an open signal to the inlet 112. The inlet 112 opens and fluid may enter the valve 110. If the outlet 116 is open prior to fluid entering the valve 100, the outlet 116 is closed prior to the inlet 112 being opened. Fluid enters the valve 110 and, as more fluid enters the valve 110, passes through the open opening 114. Fluid passes through the opening 114 and along a fluid channel 140. The fluid passes the first sensor 120 after a specific volume of fluid has passed through the inlet 112 and out of the opening 114. After a second specific volume of fluid has passed through the inlet 112 and out of the opening 114, the fluid reaches the second sensor 130. The first sensor 120 and second sensor 130 are arranged so that a greater volume of fluid is required to be present in the fluid channel 140 to activate the second sensor 130 than to activate the first sensor 120.

The second sensor 130 sends a signal to the controller when a fluid is detected. The controller may then close the inlet 112 so as to prevent any further fluid entering the valve 110. The volume of fluid held in the device 100 at this point is now a predetermined amount. This fluid may be held in the device 100 for a relatively long period of time if desired. When emission of the fluid is desired, the controller sends a signal to the outlet 116 to open. Fluid then flows from the fluid channel 140, through the opening 114 and out of the valve 110 through the outlet 116. As the fluid level (the boundary of the fluid) passes the first sensor 120, the first sensor 120 sends a message to the controller. The controller may then close the outlet 116 so that no further fluid may exit the device 100.

The sensors 120, 130 detect fluids. The sensors 120, 130 detect the presence or absence of fluids. Signals may be sent in response to an initial detection of fluid, such as for second sensor 130 to close the inlet 112. Signals may be sent in response to a lack of detection of a fluid, such as for first sensor 120 to close the outlet 116. In this manner, movement of the fluid level in the fluid channel 140 may be tracked by the sensors 120, 130. The sensors 120, 130 may detect fluids via any suitable method including difference of light absorption, light diffraction, the use of a variable capacitor, or the like. The fluids used in the fluid channel 140 preferably show a well-defined interface with one another to enable accurate readings to be made by the sensors 120, 130.

The device 100 may then be refilled with fluid entering through the inlet 112. The device 100 may be fed from a fluid source such as a fluid reservoir or the like. The fluid source is in fluid communication with the valve 110. The fluid source may be pressurised to provide fluid to the device 100. The device 100 may be advantageously arranged such that on a second operation, fluid present in the device 100 does not exit the device 100 through the re-opened inlet 112 towards the fluid source.

In this way, a predetermined and carefully controlled volume of fluid may be provided in doses by the present device 100. Moreover, this predetermined volume of fluid may be provided in a repeatable manner. The volume provided will be the volume held by the device 100 in the fluid channel 140 between the first sensor 120 and the second sensor 130. This amount can be carefully controlled by virtue of the size of the fluid channel between the sensors 120, 130 and the sensitivity of the sensors.

Pressure may be applied to the volume of fluid contained within the device 100 prior to fluidic emission so as to push the fluid through the outlet 116. This may be particularly advantageous under certain atmospheric conditions or the like wherein the fluid contained in the device 100 benefits from additional thrust to exit the device 100. This pressure may be applied by a further fluid (which may or may not be immiscible with the fluid that entered the valve 100 through the inlet 112) or a plunger or the like.

The periodicity of the opening and closing of the inlet 112 and the outlet 116 may control the 2-step process (as described above) and therefore the overall flow rate. The present device 100 may therefore maintain a controlled flow rate even with changing fluidic conditions such as fluidic resistance or the like.

Figure 2:
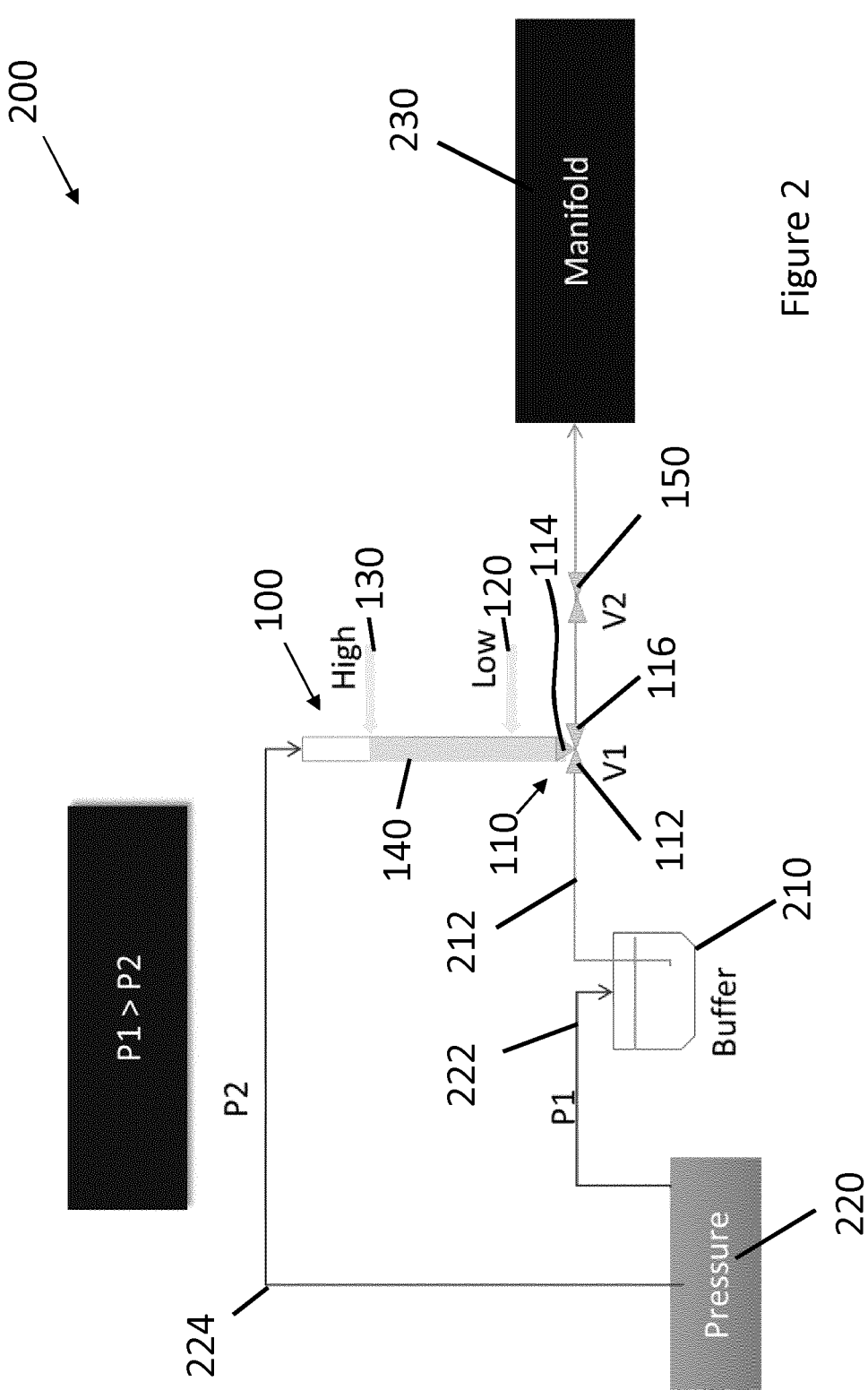
FIG. 2 shows a schematic sectional view of an apparatus comprising a device for controlling flow of a fluid in accordance with a second example.

FIG. 2 shows a schematic sectional view of an apparatus 200 comprising a device 100 for controlling flow of a fluid. Features of FIG. 2 that have been described previously in relation to FIG. 1 have the same numerals and, for improved readability, may not be described in detail here. In particular, the previously-described features of the device 100 will not be repeated here.

The apparatus 200 has a fluid source 210, a pressure source 220, and a delivery manifold 230. The fluid source 210 provides fluid for entering the device 100 via the inlet 112. The pressure source 220 provides a pressure P1 to the fluid source 210 for forcing the fluid into a conduit 212, through the inlet 112 and into the device 100. The pressure source 220 may also provide a pressure P2 to the fluid channel 140 of the device 100. The pressure source 220 therefore controls the respective pressure $\Delta P$ ($\Delta P = P1 - P2$) between the fluid source 210 and the fluid channel 140. The pressure source 220 is therefore able to control the direction of flow of the fluid when the inlet 112 is open. The pressure source 220 may be controlled by the controller of the device 100, or by any other means such as an integrated controller (not shown) of the pressure source 220.

The device 100 in the example shown in FIG. 2 has a second valve 150 in fluid communication with the outlet 116. The second valve 150 enables a volume of fluid to be held between the first valve 110 and the second valve 150 for a desired period. The second valve 150 may introduce an additional level of control over the flowing out of the first valve 110 of the fluid. The second valve 150 may have an inlet and an outlet, or may simply be a movable blocking element to prevent the passage of fluid. The second valve 150 may be activated (opened and closed) by a controller or may be pressure activated, such that a fluid pressure above a predetermined fluid pressure level forces the second valve 150 to be open.

The apparatus 200 has a delivery manifold 230. The delivery manifold 230 may have a single fluid inlet and multiple fluid outlets. The manifold 230 may have multiple outlet channels linking the multiple outlets to the inlet. The multiple outlet channels may branch off from a central inlet channel in fluid communication with the inlet. The manifold 230 may have openable valves arranged to allow a controllable distribution of the fluid from the device 100 along a specific outlet channel and out of a specific outlet of the multiple fluid outlets. The multiple channels within the manifold may not have the same resistance to fluid flow. As such, the device 100 advantageously enables controllable fluid delivery rate from a manifold 230 with differing resistances to fluid flow.

In reality, the volume delivered by the device 100 to the manifold 230 may be just greater than the volume contained between the first sensor 120 and the second sensor 130 due to the reaction times associated with the detection of the fluid (or fluid level) by the sensors 120, 130, sending a message to the controller and then subsequently the complete closing of the inlet 112 or the outlet 116 (as appropriate according to the stage in the process). In any event, these reaction times may be calculated, and accounted for accordingly, such that a predetermined and desired amount of fluid may be delivered to the manifold 230. The location of the sensors 120, 130 may be movable along the fluid channel 140 to enable a change in the volume of fluid delivered.

The user may be able to calibrate the flow rate controllably delivered by the device 100 by adjusting: the pressure P1 delivered by the pressure source 220 along conduit 222 to the fluid source 210; the pressure P2 delivered by the pressure source 220 along conduit 224 to the device 100; and, the periodicity of the opening and closing of the valves 110, 150.

The periodicity is calculated taking into account the volume of fluid delivered by the device 100 over one use iteration. To ensure repeatability over many runs, the pressures P1, P2 delivered along the conduits 222, 224 may be provided at set values. Where there is pressure loss along the conduits 222, 224, this should be taken into account accordingly to ensure the loss along one conduit does not prevent the balance of pressures being that required to maintain flow of fluid through the device 100 in the manner desired.

Figure 3:
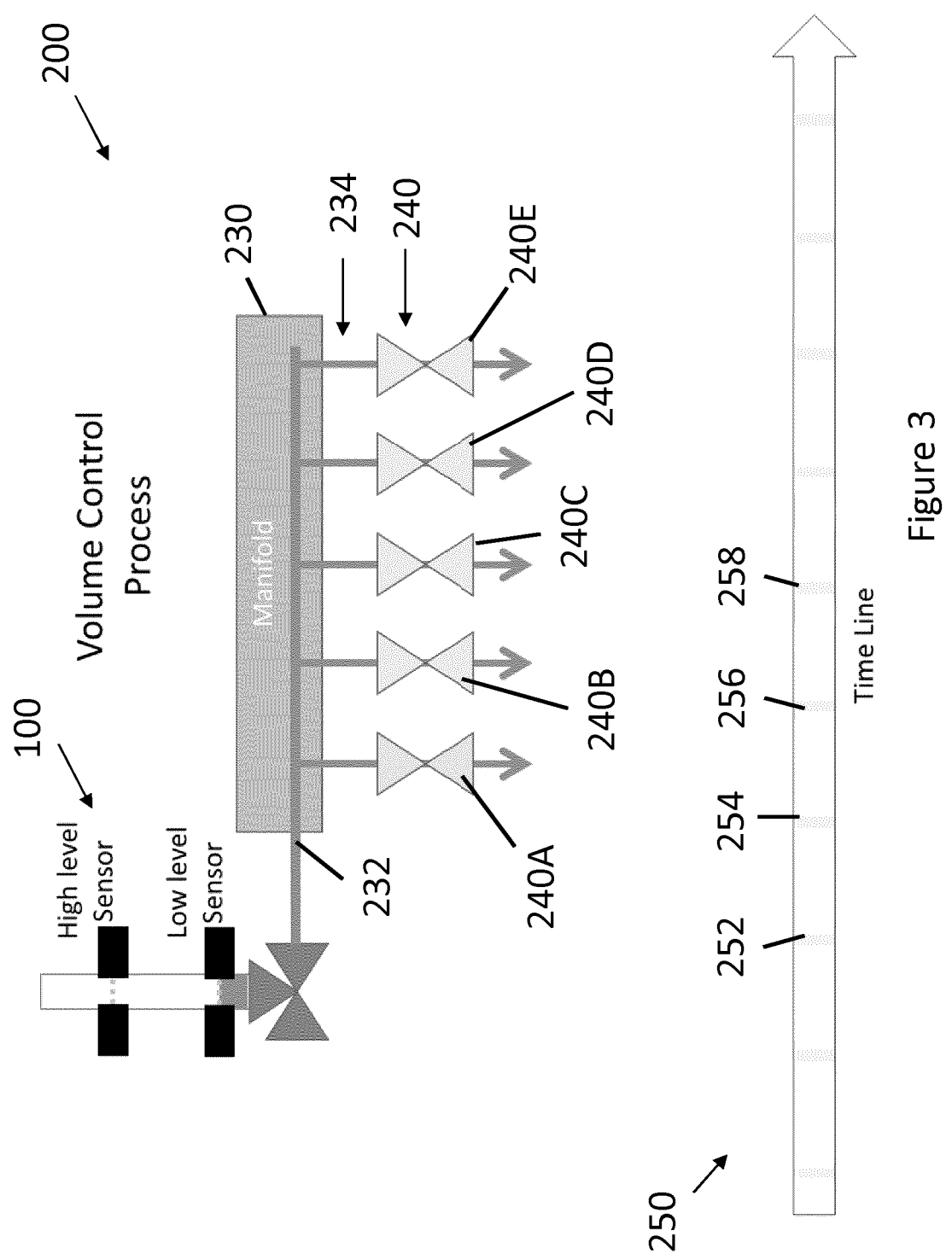
FIG. 3 shows a schematic sectional view of a portion of an apparatus comprising a device for controlling flow of a fluid in accordance with a third example.

FIG. 3 shows a schematic sectional view of a portion of an apparatus 200 comprising a device 100 for controlling flow of a fluid in accordance with a third embodiment. Features of FIG. 3 that have been described previously in relation to FIG. 1 or 2 have the same numerals and, for improved readability, may not be described in detail here. In particular, the previously-described features of the device 100 will not be repeated here.

FIG. 3 shows a portion of the apparatus 200 shown in FIG. 3 with the manifold 230 connected to a series of fluid outlets 240. In an example, the fluid outlets 240 may be a series of nozzles, or exits, or the like for a controlled delivery of fluid from the manifold 230. The manifold 230 has an inlet channel 232 connected to a plurality of outlet channels 234. In the example shown, there are an equivalent number of outlet channels 234 to fluid outlets 240.

The device 100 operates as previously described to iteratively deliver set volumes of fluid to the manifold 230. The manifold 230 may route a specific volume of fluid to a particular fluid outlet 240A, 240B etc. In this manner, the apparatus 200 may controllably deliver specific set volumes of fluid from a fluid source (not shown in FIG. 3). As shown in the time line 250, fluid delivery points 252, 254, 256, 258 occur in regular intervals. Each fluid delivery point 252, 254, 256, 258 occurs via delivery of fluid through an outlet 240A, 240B, 240C, etc.

Figure 4:
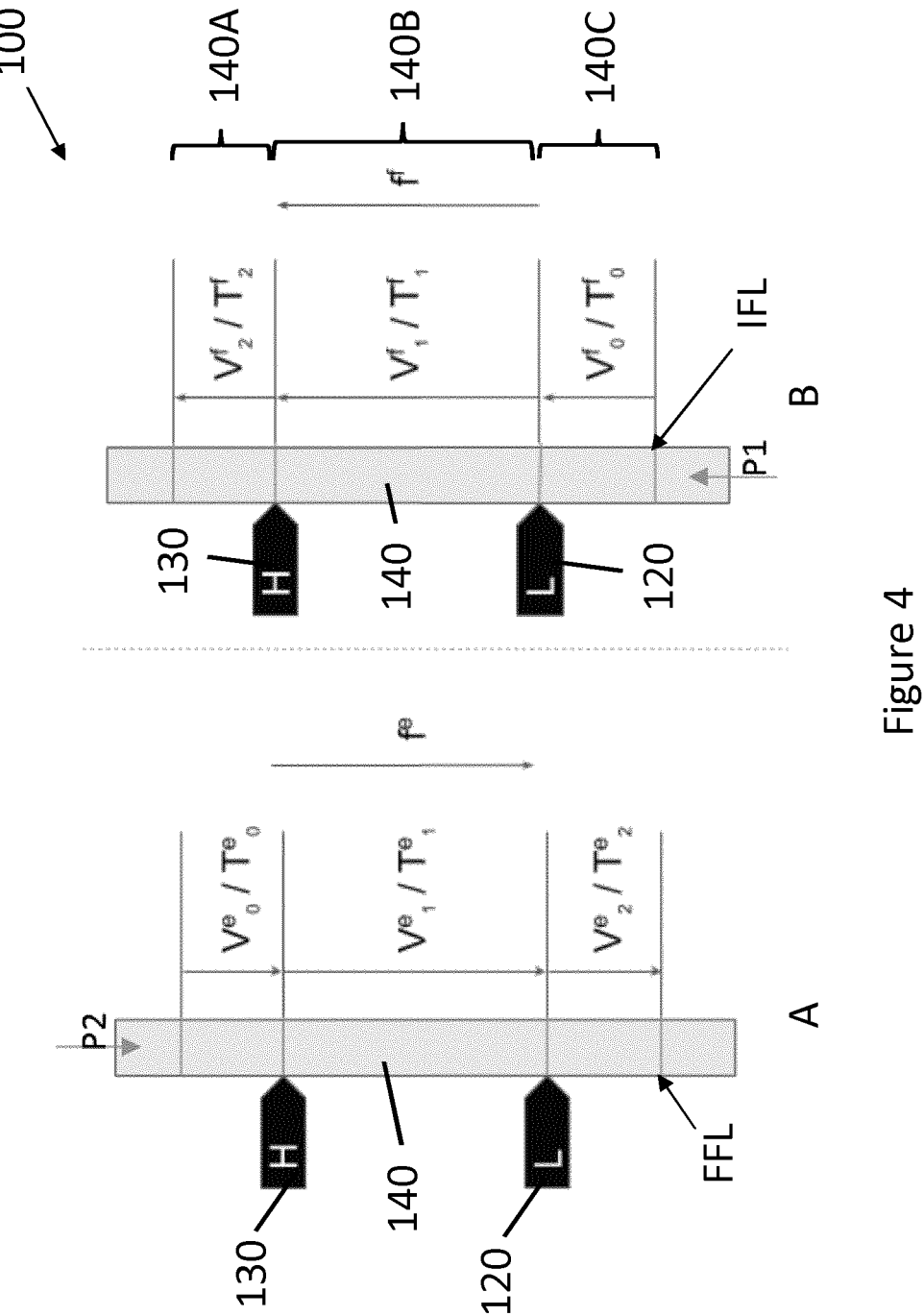
FIG. 4 shows a schematic sectional view of a portion of a device for controlling flow of a fluid in accordance with a first example.

FIG. 4 shows a schematic sectional view of a portion of a device 100 for controlling flow of a fluid in accordance with a first embodiment. FIG. 4 shows the first sensor 120, the second sensor 130 and the fluid channel 140 of the device 100.

FIG. 4 shows the two stages of operation of the device 100. The filling stage is shown in FIG. 4B and the emptying stage is show in FIG. 4A. The pressures P1, P2 provided by the pressure source 220 to the fluid source 210 and to the device 100 respectively, are shown as activating in their relevant stages. In the emptying stage, shown in FIG. 4A, pressure P2 applied along the conduit 224 linking the pressure source 220 to the device 100 operates. In the filling stage, shown in FIG. 4B, pressure P1 applied along the conduit 222 linking the pressure source 220 to the fluid source 210 operates.

FIG. 4 highlights three portions 140A, 140B, 140C of the fluid channel 140. The uppermost portion 140A represents the volume $V^e_0$, $V^f_2$ of fluid contained in the fluid channel 140 above the second sensor 130 as a result of the reaction time associated with fluid passing the second sensor 130 and the closing of the inlet 112 of the valve 110 to prevent any further fluid entering the device 100. As this reaction time is non-zero, there is some volume of fluid held in the fluid channel 140 above the second sensor 130.

The middle portion 140B represents the volume $V^e_1$, $V^f_1$ of fluid contained in the fluid channel 140 between the first sensor 120 and the second sensor 130. In a preferred embodiment this volume $V^e_1$, $V^f_1$ is greater than the volume $V^e_0$, $V^f_2$ held in the portion 140A above the second sensor 130 and the volume $V^e_2$, $V^f_0$ held in the portion 140C below the first sensor 140. This ensures that the error to be corrected by the volume $V^e_0$, $V^f_2$, $V^e_2$, $V^f_0$ held in these portions 140A, 140C is not significant in comparison to the volume $V^e_1$, $V^f_1$ held in the middle portion 140B.

The lowermost portion 140C represents the volume $V^e_2$, $V^f_0$ of fluid drained from the fluid channel 140 below the first sensor 120 as a result of the reaction time associated with fluid (fluid level) passing the first sensor 120 and the closing of the outlet 116 of the valve 110 to prevent any further fluid emptying from the device 100.

The volumes for the three portions 140A, 140B, 140C in FIGS. 4A and 4B are the same, despite their labelling in FIG. 4, due to the size of the fluid channel 140 not changing during draining (FIG. 4A) or filling (FIG. 4B) stages. By this it is meant that, volume $V^e_0$ of portion 140A in FIG. 4A is the same as volume V'2 of portion 140A in FIG. 4B, and so on for middle portion 140B and lowermost portion 140C.

Turning specifically to FIG. 4A, an emptying (or draining) stage is shown. The pressure P2 applies to the fluid contained within the fluid channel 140. The time taken for the fluid to empty from the fluid channel 140 so as to have a fluid level at the second sensor 130 is $T^e_0$. The time then taken for the fluid to empty from the fluid channel 140 so as to have a fluid level at the first sensor 120 is $T^e_1$. The reaction time then taken for the first sensor 120 to send a signal and the resultant closing of the outlet 116 of the valve 110 to prevent further fluid emptying from the fluid channel 140 is $T^e_2$. The final fluid level FFL is shown below the first sensor 120. The flow of the fluid out of the fluid channel 140, for the emptying phase, is indicated by the arrow $f^e$.

Turning specifically to FIG. 4B, a filling stage is shown. The filling stage shown is that occurring following an emptying stage, such that some fluid is already present in the fluid channel 140 prior to filling. The initial fluid level IFL is the fluid level of that fluid remaining in the fluid channel 140 following an emptying stage (as shown in FIG. 4A). The initial fluid level IFL is shown in FIG. 4B. The initial fluid level IFL of the filling stage is at the same level as the final fluid level FFL of the emptying stage shown in FIG. 4A. Pressure P1 may be applied to the fluid contained within the fluid source 210 to push fluid into the device 100 as described earlier. The time taken for the fluid to enter the fluid channel 140 so as to move the fluid level from the initial fluid level IFL to the first sensor 120 is $T^f_0$. The time then taken for the fluid to enter the fluid channel 140 so as to move the fluid level to the second sensor 130 is $T^f_1$. The reaction time then taken for the second sensor 130 to send a signal and the resultant closing of the inlet 112 of the valve 110 to prevent further fluid entering from the fluid source 210 is $T^f_2$. $T^f_2$ is dependent on the same parameters as $T^f_1$, but it can not be directly measured. So by controlling $T^f_1$, we indirectly control $T^f_2$, which in turn ensures the volume over the second sensor 130 remains constant. The flow of the fluid into the fluid channel 140, for the filling phase, is indicated by the arrow ff.

When the volumes $V^f_2$ and $V^f_0$ at either ends are maintained so as to be constant and the volume $V^f_1$ in between the sensors 120, 130 is kept constant, the total volume delivered by the device 100 is kept constant.

The device 100 disclosed herein is able to account for changing fluidic conditions, e.g. resistances in the fluid or the pipes into which the fluid is delivered, by for example adapting the refilling pressure P1 applied to the fluid source 210.

On re-filling, the volume $V^f_0$ needs to be re-filled and this volume $V^f_0$ depends on the pressure and fluidic resistance during the emptying phase. As mentioned above, this volume $V^f_0$ (equivalently $V^e_2$) is allowed to exit the device 100 during the "reaction time" of the first sensor 120 during emptying. To keep the time $T^f_0$ constant across multiple iterations of filling and emptying, the time $T^e_2$ can be adapted. This may be coordinated by the controller of the device 100. This in turn may be used to ensure the volume below the first sensor 120 is constant.

In the case of a pressure loss, pressure P1 delivered to the fluid source 210 may be adapted. This adaptation affects the time taken $T^f_1$ for the fluid to fill the volume $V^f_1$ between both sensors 120, 130. This time should be kept constant. As fluidic resistance increases, pressure P1 should increase so as to maintain the same time $T^f_1$ for filling the volume $V^f_1$. I.e. time $T^f_1$ is controlled by the pressure P1. $T^f_1$ is also dependent on the volume $V^f_1$ however for constant dimensions of the fluid channel 140, this volume $V^f_1$ is constant.

The relationship between the pressure P1 applied to the fluid source 210 and the pressure P2 through the conduit 224 is managed to ensure the time $T^f_1$ is constant across multiple iterations of fluid delivery. This is due to the pressure difference felt at both ends of the fluid channel 140 being a controlling factor to the delivery of fluid to and from the fluid channel 140.

Fluid herein may refer to a gas or a liquid. Detection of fluid relates to the detection of the fluid which enters the device 100 from a reservoir or the like. The device 100 does not ideally contain a vacuum and, as such, a secondary fluid will be present in the device 100 and replaced by the primary fluid entering the device 100 from the fluid source 210 or the like. It is this fluid which is transiently in the device 100 which is detected by the first and second sensors 120, 130. Such sensors may operate using IR spectroscopy, magnetism (alongside a magnetic float), a conductive sensor or pneumatic sensors to detect fluid.

The phrase "detecting a fluid" may be used herein to refer to at least one of the following: detecting a fluid being adjacent a sensor; detecting a fluid passing a sensor; detecting a change in fluid from a first fluid to a second fluid being adjacent a sensor; and, detecting a change in fluid from a first fluid to a second fluid passing a sensor. "Adjacent" may be used herein as meaning in the vicinity of, or nearby, and is not limited necessarily to being directly adjacent a sensor.

Fluid that is replaced in the fluid channel 140 during use may exit the device 100 via a one way valve such as a pressure release valve, or the fluid may be pressurised elsewhere in the device 100. This may assist in overfilling the device 100 with fluid as the entering fluid has to work against the pressure of the replaced fluid.

In any of the above examples, rather than using a controller to control opening and closing of the valve inlet 112 and the valve outlet 116, the inlet 112 and outlet 116 may be pressure activated. In this way, fluid may enter the valve 100 when the pressure P1 through conduit 222 is great enough to overcome the resistance to fluid pressure of the inlet 112 and may exit the valve 100 when the pressure P2 through conduit 224 is great enough to overcome the resistance to fluid pressure of the outlet 116. In this way, a less complicated device 100 may be manufactured that does not require a controller.

The invention claimed is:

1. A device for controlling flow of a fluid, comprising:
   a first valve, the first valve comprising:
   a selectively openable inlet;
   an opening;
   a selectively openable outlet; and
   a fluid channel attached to the opening,
   wherein fluid may enter the first valve through the inlet, exit the first valve through the opening, enter the first valve through the opening and exit the first valve through the outlet;
   a first sensor for detecting a level of the fluid in the fluid channel;
   a second sensor for detecting the level of the fluid in the fluid channel; and
   a controller for receiving signals from the first sensor and the second sensor and for controlling opening and closing of the inlet and outlet in response to receiving said signals to thereby provide a dose of the fluid having a controlled volume equal to a volume held by the fluid channel between the first sensor and the second sensor,
   wherein the fluid channel is connected only to the opening.

2. A device according to claim 1, wherein the controller is arranged to:
   close the inlet in response to receiving a signal from the second sensor, the signal being sent in response to the second sensor detecting a fluid; and,
   close the outlet in response to receiving a signal from the first sensor, the signal being sent in response to the first sensor detecting a fluid after the signal from the second sensor is sent.

3. A device according to claim 2, wherein:
   the signal being sent in response to the second sensor detecting a fluid is a close inlet signal; and,
   the signal being sent in response to the first sensor detecting a fluid is a close outlet signal.

4. A device according to claim 2, wherein detecting a level of the fluid in the fluid channel comprises at least one of:
   detecting a fluid being adjacent a sensor;
   detecting a fluid passing a sensor;
   detecting a change in fluid from a first fluid to a second fluid being adjacent a sensor; and,
   detecting a change in fluid from a first fluid to a second fluid passing a sensor.

5. A device according to claim 1, further comprising a second valve, the second valve arranged downstream of the outlet of the first valve.

6. A device according to claim 1,
   wherein the fluid channel is arranged to hold a volume of fluid between the first valve and second sensor of 10 μl to 1000 μl of fluid.

7. A device according to claim 1 further comprising a fluid reservoir in fluid connection with the valve via the inlet,
   wherein the controller is arranged to control entry of fluid held, in use, in the fluid reservoir, to the valve via the inlet.

8. A device according to claim 1 wherein the opening is a selectively openable opening.

9. A device according to claim 1 wherein the fluid is a liquid.

10. A method of controlling flow of a fluid comprising:

filling a fluid channel with a fluid to a first predetermined level;

detecting the filling of the fluid channel to the first predetermined level;

in response to the detecting, opening an outlet of a valve to drain the fluid channel to a second predetermined level, wherein the second predetermined level is less than the first predetermined level; and, detecting the draining of the fluid channel to the second predetermined level to thereby provide a dose of the fluid having a controlled volume equal to the volume held by the fluid channel between the first predetermined level and the second predetermined level, wherein the fluid channel is connected only to the valve.

11. A method of controlling flow of a fluid, comprising:

opening an inlet of a valve to allow a fluid to enter the valve;

passing the fluid into a fluid channel through an opening of the valve;

detecting a level of the fluid in the fluid channel by a second sensor;

in response to detecting the fluid by the second sensor, closing the inlet of the valve to prevent fluid entering the valve;

after closing the inlet of the valve, opening an outlet of the valve to allow fluid to exit the fluid channel through the valve;

detecting the level of the fluid in the fluid channel by a first sensor; and, in response to detecting a fluid by the first sensor, closing the outlet of the valve to prevent fluid exiting the valve, wherein a greater volume of fluid is required to enter the valve for detection by the second sensor than for detection by the first sensor to thereby provide a dose of the fluid having a controlled volume equal to the volume held by the fluid channel between the first sensor and the second sensor, and wherein the fluid channel is connected only to the opening of the valve.

12. A method according to claim 11, further comprising in response to detecting the fluid by a second sensor, sending a message from the second sensor to a controller that fluid has been detected, and in response to receiving the message from the second sensor by the controller, sending a message to a valve to close the inlet of the valve to prevent fluid entering the valve.

13. A method according to claim 11, further comprising in response to detecting the fluid by the first sensor, sending a message from the first sensor to a controller that fluid has been detected, and in response to receiving the message from the first sensor by the controller, sending a message to a valve to close the outlet of the valve to prevent fluid exiting the valve.

14. A method according to claim 11, further comprising:

sending a message to a fluid delivery system of a fluid reservoir to initiate fluid delivery from the reservoir to the valve.

15. A method according to claim 11, wherein the controlled volume is 2 µl to 100 µl.

16. A method according to claim 11, wherein the fluid is a liquid.

17. A method according to claim 11, further comprising:

holding a fluid between the valve and the second sensor for a predetermined period of time prior to opening an outlet of the valve to allow fluid to exit the valve.

18. A device according to claim 3, wherein detecting a level of the fluid in the fluid channel comprises at least one of:

detecting a fluid being adjacent a sensor;

detecting a fluid passing a sensor;

detecting a change in fluid from a first fluid to a second fluid being adjacent a sensor; and, detecting a change in fluid from a first fluid to a second fluid passing a sensor.

19. A device according to claim 2, further comprising a second valve, the second valve arranged downstream of the outlet of the first valve.

20. A device according to claim 3, further comprising a second valve, the second valve arranged downstream of the outlet of the first valve.

* * * * *